(12) United States Patent
Allor

(10) Patent No.: US 7,171,614 B2
(45) Date of Patent: Jan. 30, 2007

(54) DISPLAYING PLUG-IN DERIVED CONTENT IN AN APPLICATION'S BROWSER-EMBEDDED WINDOW WITH CALLBACKS

(75) Inventor: Jason M. Allor, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 646 days.

(21) Appl. No.: 10/159,721

(22) Filed: May 30, 2002

(65) Prior Publication Data

US 2003/0226102 A1 Dec. 4, 2003

(51) Int. Cl.
*G06F 17/00* (2006.01)

(52) U.S. Cl. .................. 715/501.1; 715/513; 709/203

(58) Field of Classification Search ............. 715/501.1, 715/513, 738, 745; 705/1; 709/203, 219, 709/217, 232; 719/310, 329, 318
See application file for complete search history.

(56) References Cited

U.S. PATENT DOCUMENTS

| | | | | |
|---|---|---|---|---|
| 5,794,259 A * | 8/1998 | Kikinis | ....................... | 715/507 |
| 5,937,160 A * | 8/1999 | Davis et al. | ................ | 709/203 |
| 6,119,166 A * | 9/2000 | Bergman et al. | ............ | 709/232 |
| 6,199,081 B1 * | 3/2001 | Meyerzon et al. | .......... | 715/513 |
| 6,253,234 B1 * | 6/2001 | Hunt et al. | ................. | 709/213 |
| 6,266,681 B1 * | 7/2001 | Guthrie | .................... | 715/501.1 |
| 6,343,377 B1 * | 1/2002 | Gessner et al. | ............. | 717/171 |
| 6,477,550 B1 * | 11/2002 | Balasubramaniam et al. | .... | 715/513 |
| 6,519,050 B1 * | 2/2003 | Eintracht et al. | .......... | 358/1.15 |
| 6,675,261 B2 * | 1/2004 | Shandony | .................... | 711/121 |
| 6,728,763 B1 * | 4/2004 | Chen | .......................... | 709/219 |
| 6,850,941 B1 * | 2/2005 | White et al. | .................. | 707/10 |
| 6,931,598 B2 * | 8/2005 | Price et al. | ................. | 715/760 |
| 7,032,124 B2 * | 4/2006 | Greenbaum | .................... | 714/5 |
| 2002/0154162 A1 * | 10/2002 | Bhatia et al. | ............... | 345/745 |
| 2002/0178187 A1 * | 11/2002 | Rasmussen et al. | ........ | 707/513 |
| 2003/0061567 A1 * | 3/2003 | Brown et al. | ............... | 715/507 |
| 2003/0142127 A1 * | 7/2003 | Markel | ....................... | 345/738 |
| 2004/0210420 A1 * | 10/2004 | Lee | ............................. | 702/186 |
| 2005/0108033 A1 * | 5/2005 | Everett-Church | ............. | 705/1 |

OTHER PUBLICATIONS

Shepherd, G. and S. Wingo, "How MFC Does ActiveX Connections," *Dr. Dobb's Journal*, Apr. 1997, pp. 109-115.

* cited by examiner

*Primary Examiner*—Doug Hutton
*Assistant Examiner*—James H Blackwell
(74) *Attorney, Agent, or Firm*—Christensen O'Connor Johnson Kindness PLLC

(57) ABSTRACT

A system and method for displaying plug-in supplied content in a browser-embedded window is provided. A plug-in module supplies content to a host application for display in a browser-embedded window. The plug-in supplied content contains special tags which identify certain processing actions to be taken by the host application on the content prior to display. The special tags in the content relieve the plug-in module from modifying its content upon installation according to the installation location of the host application. The special tags identify references, images, and controls. The control tags enable the plug-in module to receive event messages from controls embedded in the content that are manipulated by a user in the browser-embedded window. The plug-in modules implement a well-defined set of callback routines for receiving the event messages.

43 Claims, 12 Drawing Sheets

*PRE-PROCESSED PLUG-IN CONTENT*

```
<html xmlns:xapphtml="http://www.microsoft.com">                    502
<head>
<title>Browser Embedded Window</title>
<xapphtml:link rel="stylesheet" type="text/css">StyleSheets\MySheet.css</xapphtml:link>      504
</head>
<body bgcolor="#EEEEEE">
<center>
<h1>Plug-In Options</h1>
<p/>
<xapphtml:image height="25" width="25">Image1.jpg</xapphtml:image>            506
<xapphtml:hyperlink ordinal="1">Option A</xapphtml:hyperlink>                 508
<p/>
<xapphtml:image height="25" width="25">Image2.jpg<xapphtml:image>
<xapphtml:hyperlink ordinal="2">Option B</xapphtml:hyperlink>
<p/>
<xapphtml:image height="25" width="25">Image3.jpg<xapphtml:image>
<xapphtml:hyperlink ordinal="3">Option C</xapphtml:hyperlink>
</center>
</body>
</html>
```

*Fig.5.*

```
<html xmlns:xapphtml="http://www.microsoft.com">
<head>
<title>Browser Embedded Window</title>
<script language="javascript">
function callBack(a)
{
    var objControl = new ActiveXObject("MyApp.MyInterface")
    objControl.MyCallbackFunction(a)
}
</script>
<link href="c:\MyApp\XAppHtml\StyleSheets\MySheet.css" rel="stylesheet" type="text/css"/>
</head>
<body bgcolor="#EEEEEE">
<center>
<h1>Plug-In Options</h1>
<p/>
<img src="c:\MyApp\XAppHtml\Image1.jpg" height="25" width="25"/>
<a href="javascript:callBack(1)">Option A</a>
<p/>
<img src="c:\MyApp\XAppHtml\Image2.jpg" height="25" width="25"/>
<a href="javascript:callBack(2)">Option B</a>
<p/>
<img src="c:\MyApp\XAppHtml\Image3.jpg" height="25" width="25"/>
<a href="javascript:callBack(3)">Option C</a>
</center>
</body>
</html>
```

*POST-PROCESSED PLUG-IN CONTENT* — 608, 602, 604, 606

*Fig.6.*

DISPLAYING PLUG-IN DERIVED CONTENT IN AN APPLICATION'S BROWSER-EMBEDDED WINDOW WITH CALLBACKS

FIELD OF THE INVENTION

This invention relates to displaying content in browser-embedded windows, and more particularly to a system and method for processing and displaying plug-in supplied content in a browser-embedded.

BACKGROUND OF THE INVENTION

One of the reasons the World Wide Web (or Web) is so popular is the ability of users to publish and interact with rich content. Examples of rich content include Web sites with both foreground and background images, multiple colors, interactive controls, fonts, audio clips, code modules, and animation. Users generally interact with rich content using Web browsers. Web browsers display the rich content from Web sites to the user and permit the user to interact with the rich content using input devices such as a keyboard or a mouse. Creating and editing rich content is relatively easy. Many software applications generate professional looking rich content. These applications enable a user to create rich content including images, fonts, sounds, animation, and user-interactive controls.

Because of a Web browser's ability to display rich content, some Web browsers have been modularized so that they can be embedded in display windows of other applications. There are at least two benefits realized by embedding a Web browser in a display window: first, an application developer is relieved of crafting a display mechanism in the application; and second, as described above, the content is full featured, and easy to generate and modify.

Web browsers generally display 'standard' rich content: rich content containing those features defined according to some standard. HTML (hypertext markup language), XHTML (extensible hypertext markup language), and XML (extensible markup language) are examples of rich content formats that have been "standardized" by the World Wide Web Consortium (the W3C), a widely recognized standardization body for developing interoperable technologies for information exchange, commerce, and communication on the Web. Before they become standards according to the W3C, or some other standardization body, proprietary or specialized features developed within the foregoing (and other) formats are deployed on Web sites. Some of these new features may never be standardized. For these cases, most Web browsers have been developed to accept plug-in modules. In a general, plug-in modules are software extensions to an application, specifically in this case, a Web browser. A user will typically install a plug-in module into a specific directory location associated with a Web browser. This will typically be a known location that the Web browser searches when starting up. If the plug-in module is properly located, the Web browser will properly interact with the plug-in module to extend, or enhance, the Web browser's abilities, including displaying nonstandard, proprietary features stored in a Web file.

Combining these features—Web browsers adapted to function as display modules having plug-in extensibility—creates an extremely adaptable and powerful display mechanism. Unfortunately, while display of rich content through a browser-embedded window is a relatively simple process, interaction with embedded controls in rich content is problematic. This difficulty arises from the structure of the browser-embedded display: an interactive control in a browser-embedded window will send control messages, also referred to as callbacks, from the embedded controls to the application that "owns" the browser-embedded window, and not the plug-in module from whence the content originated. Currently, to handle this situation, each plug-in module must arrange with each host application some way for receiving callbacks from controls embedded in the rich content from the host application. No standardized mechanism exists to accomplish the transfer of such control messages.

Another problem facing plug-in module developers arises from the installation location of a host application. With few exceptions, a user may install a host application in any directory location. As previously mentioned, in order to properly function, plug-in modules and associated files must be installed in certain locations in relation to the host application. For example, many host applications require that plug-ins be installed in a specific subdirectory, and associated files, such as images, rich content, or plug-in related data, be installed in other known locations. These location requirements create difficulty for rich content files containing references to other related plug-in files. Currently, references to other related files in the rich content must be modified when installing a plug-in module, as it is only during installation that the precise locations of these related files can be determined. Later updating of these files presents the same problem: the need to modify the plug-in related files according to the installation directory of the host application.

What is needed is a system and method for enabling plug-in modules to display rich content within a browser-enabled window and receive callbacks from controls embedded within the rich content in a standardized manner. The system and method should provide a way to reference related files without explicit modifications to the related files for each host installation. The present invention is directed to fulfilling this need.

SUMMARY OF THE INVENTION

In accordance with the present invention, a standardized mechanism for plug-in modules to submit rich content for display in a browser-embedded window is provided. A plug-in module, properly installed with a host application, submits rich content to the host application for display in a browser-embedded window. The rich content contains certain markers that the host application identifies and converts into a form suitable for display in a browser-embedded window. The markers identify either additional files stored with the host application, including images or other rich content, or information for receiving callbacks from controls embedded within the content. After having converted the markers in the rich content to a form suitable for display in the browser-embedded window, the host application opens the browser-embedded window and displays the rich content.

In accordance with other aspects of the present invention, the host application scans the rich content received from the plug-in module, searching for certain tags identifying areas in the rich content that the host application must process. Tags of one type indicate to the host application that it is a reference to other content installed in a known, host application specific location. When this type of tag is encountered, the host application removes certain data from the existing tag, adds host application information to that data to identify the specification location, and replaces that tag with a new tag properly referencing the other plug-in content. Other types of tags indicate to the host application to provide callback information to the plug-in module according to information in the existing tag. When these tags are encountered, the host application removes certain data from the existing tag that identifies a control in the rich content, combines this data with host specific data for effectuating the transfer from the host application to the plug-in module, and replaces the existing tag with a new tag containing the callback content.

In accordance with other aspects of the invention, plug-in modules for receiving callbacks from controls embedded in rich content displayed in a browser-embedded window are provided. The host application converts certain tags located within rich content to facilitate callbacks from controls embedded within the rich content. User manipulation of one of these controls in the rich content in the browser-embedded window causes the host application to receive notice of the control's manipulation. The notice indicates that a callback is to be made to the plug-in module. The host application makes that callback based on the information contained in the notice of the control's manipulation.

In accordance with another aspect of the present invention, a method for providing a standardized mechanism for plug-in modules to submit rich content for display in a browser-embedded window is provided.

In accordance with yet further aspects of the present invention, a method for plug-in modules to receive callbacks from controls embedded within the rich content displayed in a browser-embedded window is provided.

In accordance with still further aspects of the present invention, a method for resolving references within rich content from a plug-in module by a host application is provided.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 is illustrative of exemplary content from a plug-in module prior to processing by a host application and display in a browser-embedded window;

FIG. 6 is illustrative of exemplary content from a plug-in module after processing the content by the host application, and prior to submitting it to display in the browser-embedded window;

DETAILED DESCRIPTION OF THE PREFERRED EMBODIMENT

The present invention relates to a system and method for displaying plug-in derived rich content in a browser-embedded window of a host application, and providing callback information to a plug-in module from controls embedded in rich content displayed in the browse-embedded window.

Figure 1:
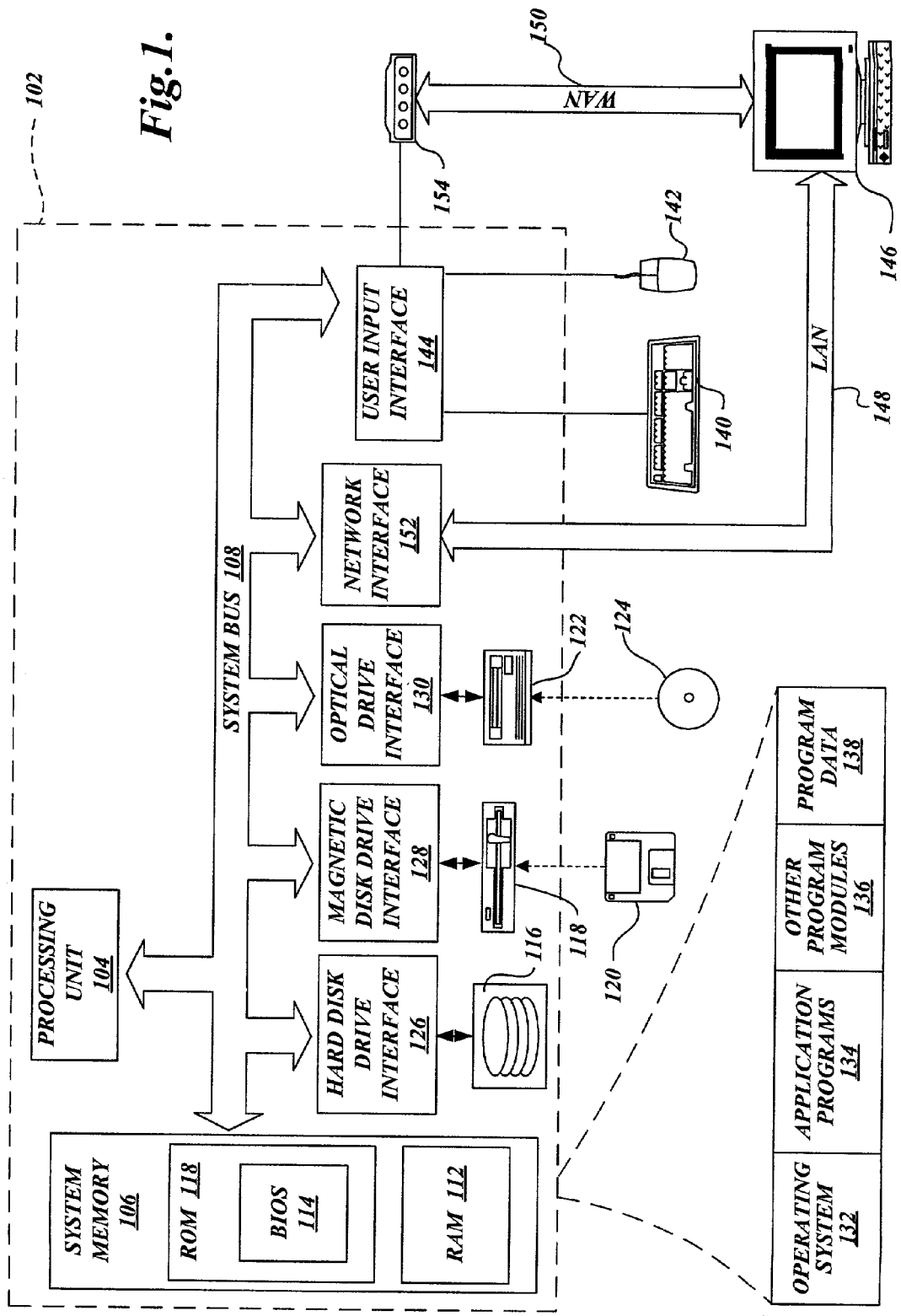
FIG. 1 is a block diagram of a computer suitable for providing an exemplary operating environment for the present invention.

FIG. 1 and the following discussion are intended to provide a brief, general description of a suitable computing environment in which the invention may be implemented. While the invention will be described in the general context of personal computers, one skilled in the art will recognize that the present invention may also be practiced in a distributed computing environment, where complimentary tasks are performed by remote computing devices linked together through a communications network. Additionally, one skilled in the art will also appreciate that the invention may be practiced with many other computer system configurations, including hand-held devices, multiprocessor systems, microprocessor-based or programmable consumer electronics, minicomputers, mainframe computers, and the like. The invention may be practiced in a local area network, or alternatively, on a single computer using logical, rather than physically remote, devices. Additionally, while the invention will be described in terms of application programs that run on an operating system in conjunction with a personal computer, those skilled in the art will recognize that the invention also may be implemented in combination with other program modules. Generally, program modules include routines, programs, components, data structures, etc. that perform particular tasks or implement particular abstract data types.

With reference to FIG. 1, an exemplary system for implementing the invention includes a conventional personal computer 102, including a processing unit 104, a system memory 106, and a system bus 108 that couples the system memory to the processing unit 104. The system memory 106 includes read only memory (ROM) 110 and random access memory (RAM) 112. A basic input/output system (BIOS) 114, containing the basic routines that help to transfer information between elements within the personal computer 102, such as during startup, is stored in ROM 110. The personal computer 102 further includes a hard disk drive 116, a magnetic disk drive 118, e.g., to read from or write to a removable disk 120, and an optical disk drive 122, e.g., for reading a CD-ROM disk 124 or to read from or write to other optical media. The hard disk drive 116, magnetic disk drive 118, and optical disk drive 122 are connected to the system bus 108 by a hard disk drive interface 126, a magnetic disk drive interface 128, and an optical drive interface 130, respectively. The drives and their associated computer-readable media provide nonvolatile storage for the personal computer 102. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, ZIP disks, and the like, may also be used in the exemplary operating environment.

A number of program modules may be stored in the drives and RAM 112, including an operating system 132, one or more application programs 134, other program modules 136, and program data 138. A user may enter commands and information into the personal computer 102 through input devices such as a keyboard 140 or a mouse 142. Other input devices (not shown) may include a microphone, touchpad, joystick, game pad, satellite dish, scanner, or the like. These and other input devices are often connected to the processing unit 104 through a user input interface 144 that is coupled to the system bus, but may be connected by other interfaces (not shown), such as a game port or a universal serial bus (USB). A monitor (not shown) or other type of display device is also connected to the system bus 108 via an interface, such as a video adapter (not shown). In addition to the monitor, personal computers typically include other peripheral output devices (not shown), such as speakers or printers.

The personal computer 102 may operate in a networked environment using logical connections to one or more remote computers, such as a remote computer 146. The remote computer 146 may be a server, a router, a peer device or other common network node, and typically includes many or all of the elements described relative to the personal computer 102. The logical connections depicted in FIG. 1 include a local area network (LAN) 148 and a wide area network (WAN) 150. Such networking environments are commonplace in offices, enterprise-wide computer networks, intranets and the Internet.

When used in a LAN networking environment, the personal computer 102 is connected to the LAN 148 through a network interface 152. When used in a WAN networking environment, the personal computer 102 typically includes a modem 154 or other means for establishing communications over the WAN 150, such as the Internet. The modem 154, which may be internal or external, is connected to the system bus 108 via the user input interface 144. In a networked environment, program modules depicted relative to the personal computer 102, or portions thereof, may be stored in the remote memory storage device. It will be appreciated that the network connections shown are exemplary and other means of establishing a communications link between the computers may be used.

Figure 2:
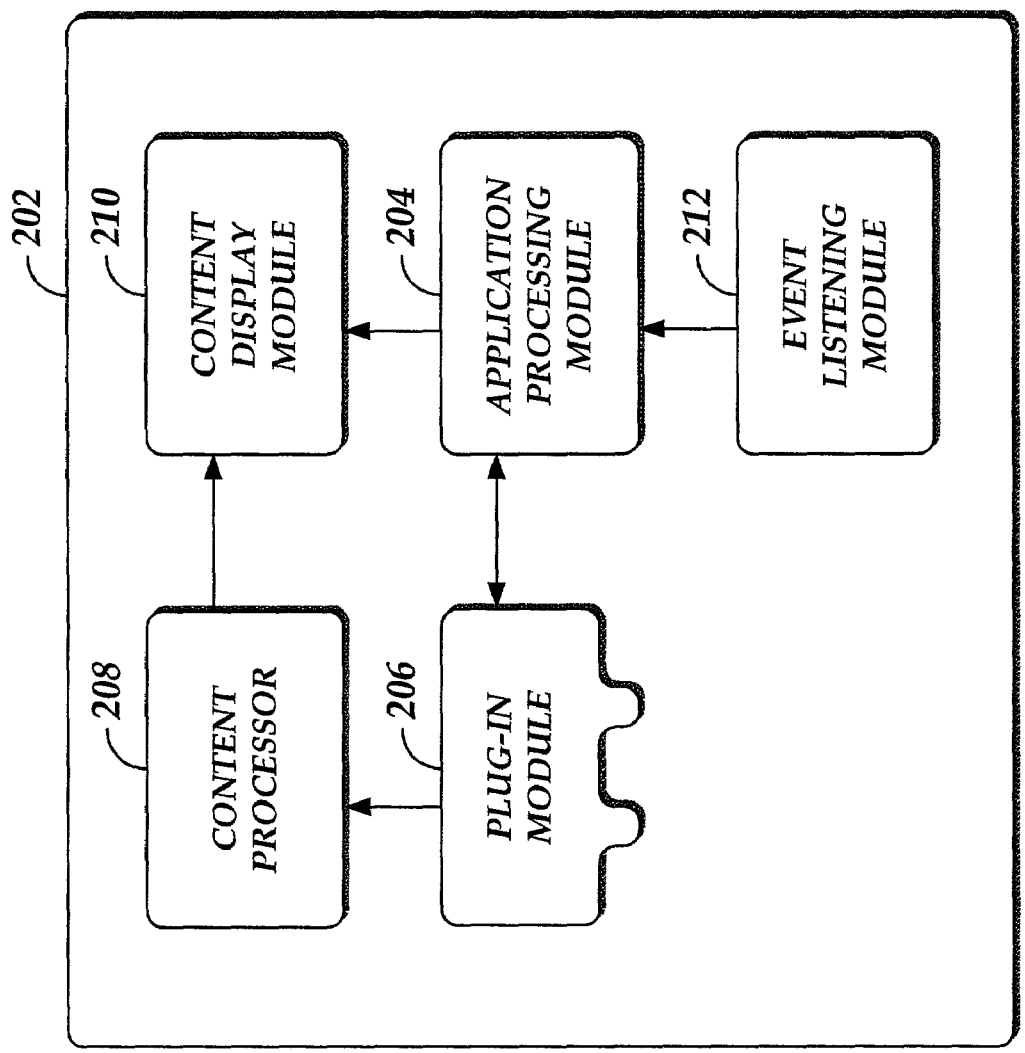
FIG. 2 is a block diagram of certain components of an exemplary host application suitable for hosting plug-in modules and displaying plug-in supplied content in a browser-embedded window.

FIG. 2 is a block diagram of certain components of an exemplary host application 202 suitable for hosting plug-in modules, and for displaying plug-in supplied content in a browser-embedded window, and enabling callbacks from controls embedded in the content displayed in the browser-embedded window.

Those skilled in the art will appreciate that plug-in modules are used to extend the functionality of a host application. Microsoft's Internet Explorer is one example of a host application that supports plug-in modules. The host application 202 also supports the display of plug-in module supplied content through the host application's browser-embedded window (not shown).

The host application 202 includes an application processing module 204. The application processing module 204 is the processing core of the host application 202. Because host applications are created to perform a variety of tasks, the application processing module 204 is only discussed in relation to this application in a generic fashion. The application processing module 204 carries out the general functions of the host application 202. Additionally, the application processing module 204 cooperates with the plug-in module 206 to extend the functionality of the host application 202.

The plug-in module 206 communicates and exchanges information with the application processing module 204 in order to cooperatively carry out the added functionality provided by the plug-in module 206. Additionally, the plug-in module 206 may have related content to display to a user apart from the cooperative processing with the application processing module 204.

The plug-in module 206 is installed with the host application 202 on a computer. Those skilled in the art will recognize that during the installation of the plug-in module 206, the installation process identifies the location of the host application 202 and installs the plug-in module 206 with the host application. Key host application locations on the computer are identified and the plug-in module, and related files, are installed in those key locations. The plug-in module 206 does not modify any content in the related files intended for display in a browser-embedded window. Advantageously, because the plug-in module 206 does not need to modify the content of related files for display in a browser-embedded window, the installation process is simplified. In addition, the potential for file corruption is minimized because the related files are not modified.

The plug-in module 206 also receives event messages, also called callbacks, from controls embedded within content displayed in a browser-embedded window. A plug-in module 206 must implement a small, well-defined set of routines to receive callback information from controls embedded in the content displayed in a browser-embedded window. This information comes from the host application 202 through the applications processing module 204.

The host application 202 includes a content processor 208. The content processor's 208 function is to process embedded tags within the plug-in supplied content for display in the browser-embedded window. The content processor 208 receives the content, loads it into memory, and processes certain tags within the content for display in the browser-embedded window. Further information about processing the plug-in module's content is discussed below in regard to FIG. 8.

FIG. 2 also indicates that the host application 202 includes a content display module 210. The content display module 210 creates a browser-embedded window and sends the content processed by the content processor 208 to the browser-enabled window. The content display module 210 then causes the browser-embedded window to display. It will be appreciated by those skilled in the art, that displaying content browser-embedded windows may be utilized by more modules of a host application 202 than the plug-in module 206. As previously described, displaying content through a browser-embedded window is a convenient mechanism for displaying rich content to a user. Thus, the application processing module 204, or some other component, may also utilize the convenience of displaying content to the user through a browser-embedded window.

The host application 202 shown in FIG. 2 also includes an event listening module 212. The event listening module 212 listens for event messages from the browser-embedded window. The event listening module 212 may listen for nothing more than notice of closing of the browser-embedded window. Alternatively, the event listening module 212 may listen for event messages from controls embedded within the content displayed in the browser-embedded window. While the event listening module 212 is displayed as a module existing continuously within the host application 202, one skilled in the art will appreciate that an event listening module 212 may be created by the host application 202, or other components, as necessary to listen for event messages from a browser-embedded window. For example, the content display module 210 may create the event listening module 212 concurrently with the browser-embedded window to monitor the event messages of that window. The event listening 212 module listens for event messages from the browser-embedded window and relays those messages to the application processing module 204 for further processing. If an event message is intended for the plug-in module, the application processing module 204 will forward the event message to the plug-in module.

While FIG. 2 illustrates various components of the host application 202, it is to be understood that the illustrative components represent logical components with associated functions, and are for illustration purposes only. One skilled in the art will recognize that the described functions may be divided among more or fewer actual components in any given host application without departing from the spirit and scope of the present invention.

Figure 3:
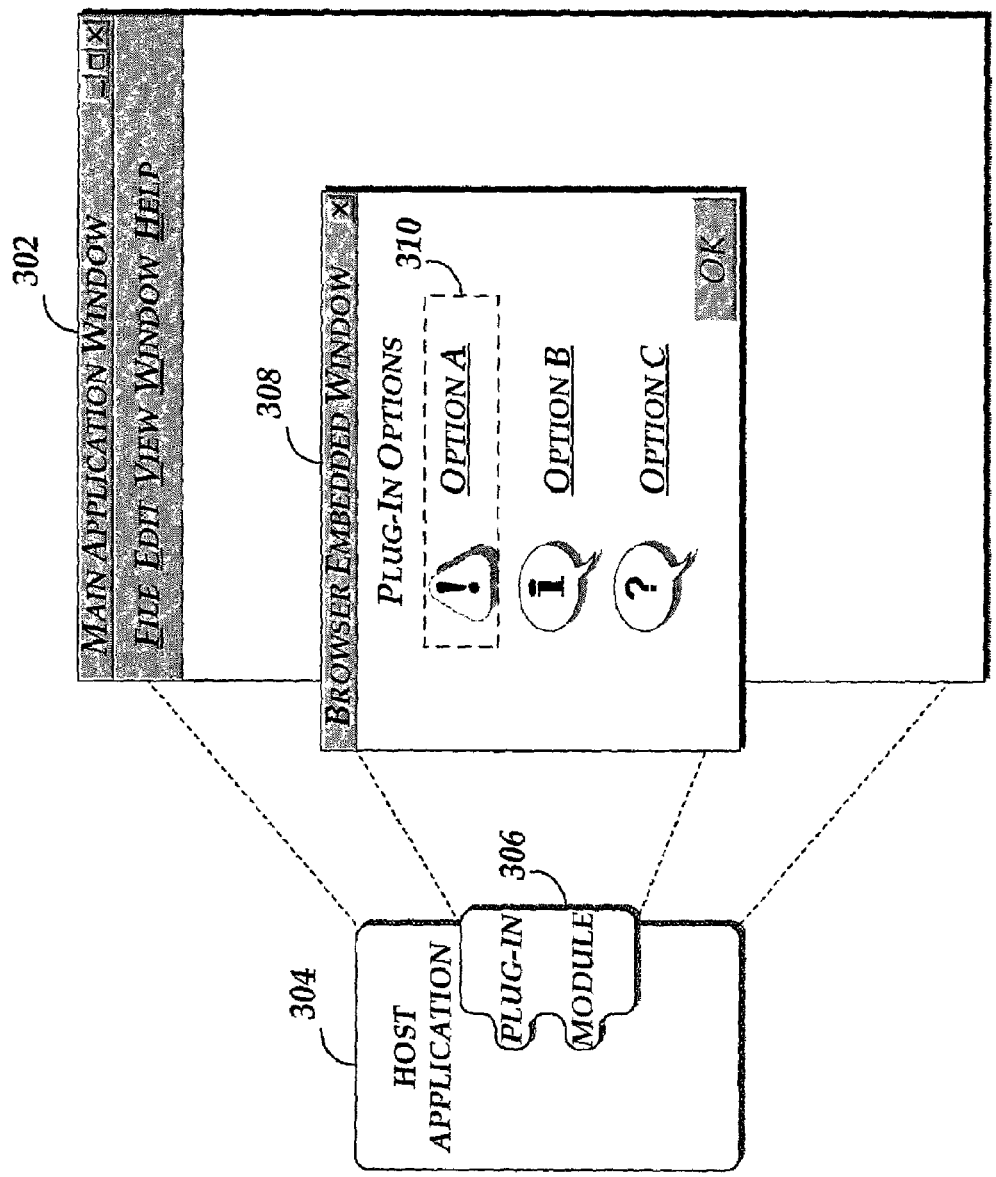
FIG. 3 is a block diagram illustrating a host application, the host application's main application window, a plug-in module, and a browser-embedded window displaying content from the plug-in module.

FIG. 3 is a block diagram illustrating the logical relationships between a host application 304, the host application's main application window 302, a plug-in module 306, and a browser-embedded window 308 for displaying plug-in derived content. The main application window 302 represents the window through which a user typically interacts with the host application 304. As shown in FIG. 3, the host application 304 also contains the plug-in module 306. The plug-in module 306 is shown to be logically responsible for displaying the content in the browser-embedded window 308. As previously described, the host application 304, or one of its components, is actually responsible for creating and displaying the browser-embedded window 308, and the plug-in module supplies the content for display. The contents of the browser-embedded window 308 represent an example of what a plug-in module 306 may send to the application for display in the browser-embedded window 308. The items bounded by a box 310 represent actionable items in the content displayed in the browser-embedded window 308, that cause the browser-embedded window to perform an action, including making a callback on the plug-in module 306 or displaying related content. Thus, an actionable item may reference a link to other content, an image, or may represent a control targeted at the plug-in module 306.

Figure 4:
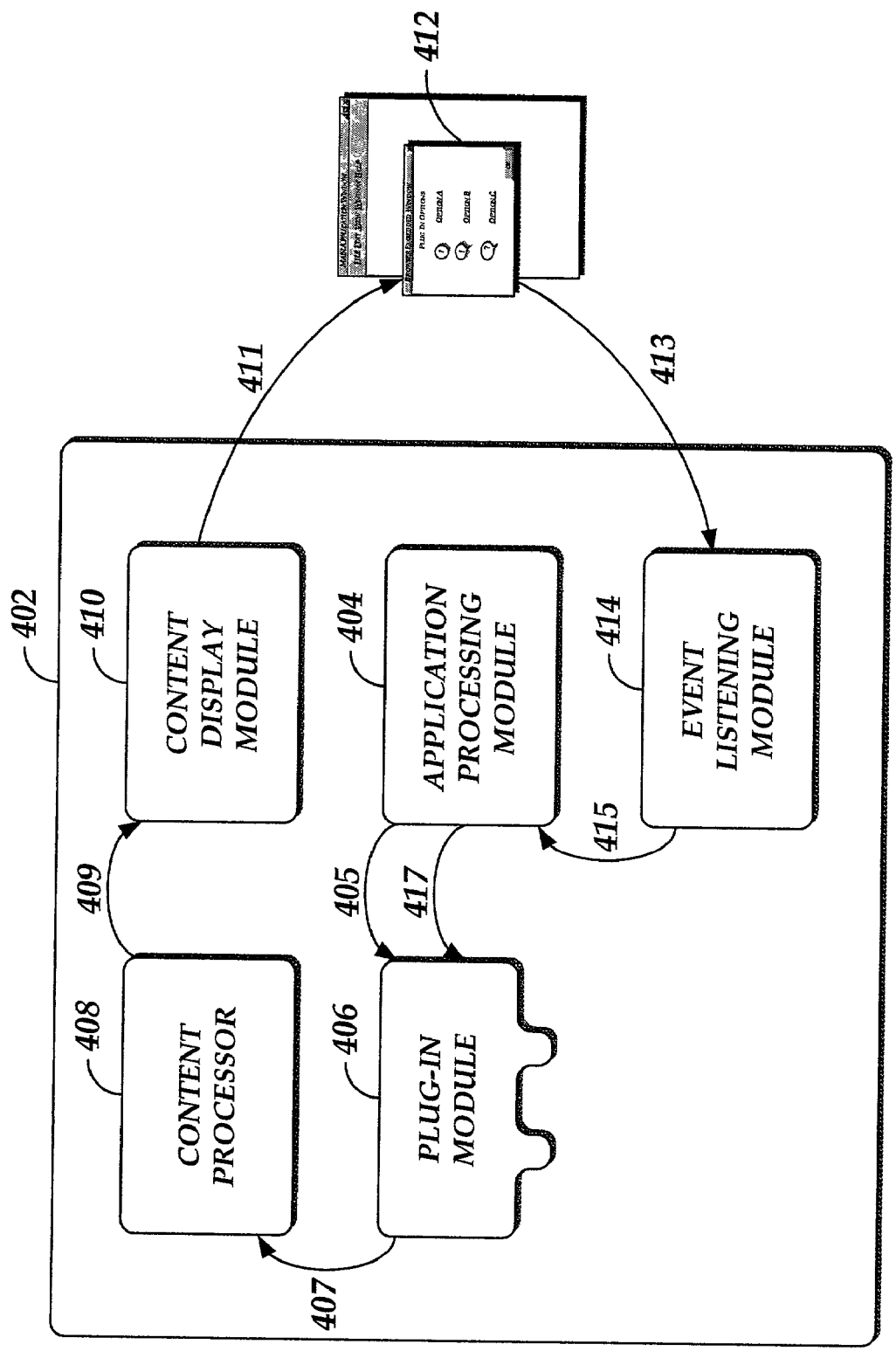
FIG. 4 is a block diagram illustrating an exemplary exchange of information between components of a host application and a plug-in module in connection with displaying content from the plug-in module.

FIG. 4 is a block diagram illustrating an exemplary exchange of information between the logical components of a host application 402 and a plug-in module 406 when displaying content from the plug-in module 406. At some point while executing, the plug-in module 406 determines that it needs to display content to the user. For example, an application processing module 404 may signal the plug-in module 406 to display its content to the user, as denoted by arrow 405. Alternatively, the plug-in module may determine by itself that displaying content to the user is necessary. In either case, the plug-in module 406 sends its content to a content processor 408, as denoted by arrow 407. After processing the content for display in a browser-embedded window, described below in regard to FIG. 8, the content processor 408 transmits the processed content to a content display module 410, as denoted by arrow 409. The content display module 410 then creates a browser-embedded window 412, sends the content to the browser-embedded window 412, and causes the browser-embedded window 412 to display, as denoted by arrow 411.

The user interacts with the browser-embedded window 412 and, in this example, manipulates an actionable control embedded in the content in the browser-embedded window 412. This manipulation causes the browser-embedded window 412 to transmit an event message to the event listening module 412, as denoted by arrow 413. The event message identifies what control was manipulated in the browser-embedded window 412. After receiving the event from the browser-embedded window 412, the event listening module 414 forwards the event to the application processing module 404, as denoted by arrow 415. The application processing module 404 determines that the control event is directed to the plug-in module 406 and transmits the control event message to the plug-in module 406 through the callback routines implemented by the plug-in module 406, as denoted by arrow 417.

Alternatively, the actionable item in the browser-embedded window 412 may reference plug-in related content, such as another content file or an image. After having been processed, references to related content appear as typical hyperlinks in a browser-embedded window. In these cases, the browser-embedded window 412 traverses the referenced content and displays it in place of the referencing content. One skilled in the art will recognize that traversing hyperlinks is widely known in the art. Thus, traversing hyperlinks is not described here. No messages are forwarded from the browser-embedded window 412 to the host application 402 when traversing a hyperlink.

FIG. 5 is an illustrative example of content received by a host application from a plug-in module prior to processing by the host application for display in a browser-embedded window. The first line of this content file, encompassed by a box 502, is one example of an exemplary embodiment of the invention, in particular, the use of name spaces. Name spaces, are used to create tags that have meaning according to the name space definition. In this example, the XAPPHTML name space is used. While the XAPPHTML is used to define the name space in this example, one skilled in the art will appreciate that the actual name is important only as a name space identifier. Any name could be used so long as a host application recognizes it as one of the identifying tags to be processed, and it uniquely identifies those tags. Additionally, while the present invention utilizes name spaces to identify tags for processing, one skilled in the art will appreciate that there are many other ways in which a plug-in module may embed special markers within a content file, identifiable to a host application, for processing in order to be displayed in a browser-embedded window.

The line of content encompassed by box 504 shows one example of a tag to be replaced by the content processor. This tag first identifies the name space for the remainder of the information in the tag, XAPPHTML. Next comes the type of tag, which in this case is LINK. According to this exemplary embodiment of the invention, the XAPPHTML: LINK tag in the pre-processed content, refers to additional content that has been installed by the plug-in module in a known location in the host application's installation directory. The tag type is followed by additional attribute information. In this particular example, the tag identifies a style sheet is to be used for the content's display. Since the use of style sheets to guide the display of content is known to those skilled in the art, such style sheet usage is not described here. Following the opening tag, the style sheet's file name is identified, in this case "StyleSheets\MySheet.css". From the information on this line, the content processor will determine that the style sheet will be found in a known directory on the host application under the subdirectory "StyleSheets," and that the file name is "MySheet.css." The line ends with a corresponding closing tag. When all tags within a content file have corresponding closing tags, it is said that the content file is well-formed. Well-formed content files are known to those skilled in the art. Preferably, preprocessed content files formed in accordance with the invention are well-formed files.

The line encompassed by box 506 identifies another tag, within the exemplary content file, that will be replaced by the content processor. As with the XAPPHTML:LINK tag in box 504, this tag begins with the name space identifier, XAPPHTML, which identifies the tag as one to be processed before display. In this case, the tag's type is IMAGE. According to this exemplary embodiment of the invention, the XAPPHTML:IMAGE tag indicates to the content processor that the information in the tag identifies an image (or graphic) file to be displayed in the browser-embedded window. Within the tag are various attributes for the image, in this case height and width information. Following the opening tag is the name of the image file, "Image1.jpg." This information indicates to the content processor both the name of the image file, and that the image file is installed in a known location for images, according to the installation area of the host application. The image file name is followed by a corresponding closing tag.

Box 508 identifies another tag to be processed by the content processor. As with the previously discussed tags, this tag also begins with the name space identifier, XAPPHTML. Following the namespace comes the tag's type, in this case HYPERLINK. An XAPPHTML:HYPERLINK tag indicates to the content processor that information in the tag describes a control embedded in the content, and that the plug-in module wishes to be notified if the user manipulates that control. This type of notification is referred to as a callback. Attribute information follows the tag type, in this case "ordinal", which identifies a value that is to be returned from the control to the plug-in as callback information. When this control in the browser-embedded window is manipulated, a value of "1" will be returned to the plug-in module's callback routine. Following the opening tag is the text that will be displayed as the control in the browser-embedded window, the control that the user may manipulate. In this particular case, manipulation will simply be a user clicking on the text "Option A." Finally, the corresponding end tag is encountered. A brief scan of the remainder of FIG. 5 reveals other tags that will be processed by the content processor in the manner described above. The other tags include additional image and hyperlink tags.

According to one embodiment of the present invention, as illustrated in FIG. 5, certain tag names, LINK, IMAGE, and HYPERLINK, are used to identify to the content processor certain actions to be performed. These should be taken as exemplary, not limiting on the invention. Thus, one skilled in the art will appreciate that any tag names may be used, as long as they uniquely identify to the content processing component the processing action to be taken.

While FIG. 5 illustrates pre-processed content containing tags that the content processor locates and processes for display in a browser-embedded window, FIG. 6 illustrates how the plug-in supplied content of FIG. 5 appears after it has been processed by a content processor for display in a browser-embedded window. That is, FIG. 6 illustrates post-processed content that is ready for display in a browser-embedded window, whereas FIG. 5 illustrates pre-processed content comprising both embedded processing tags and content ready for display in a browser-embedded window.

Turning to FIG. 6, the content encompassed by box 602 contains a common LINK tag that has been processed by the content processor. More specifically, box 602 corresponds to the line encompassed by box 504 in FIG. 5. As can be seen, the name space has been removed from the box 602 LINK tag, as the purpose of the namespace was only to identify the tag to a content processor as a tag for processing. An "href" attribute has been added to the tag to identify the complete style sheet path within the host application system. An exemplary path, "c:\MyApp\XappHtml\", has been added to the "StyleSheets\MySheets.css" path and name in the original tag. In this exemplary embodiment, this path identifies the location for these types of files according to the installation location of the host application. One skilled in the art will appreciate that this particular path included is merely for illustration purposes, and should not be construed as restricting the location of the related content. Additionally, other attributes, "rel" and "type", which were identified in the pre-processed tag, have been inserted into this new tag. The illustrated post-processed content is a well-formed document. In this case, the LINK tag is both an opening and closing tag, as shown by the "/>" indicators.

The line of content encompassed by box 604 corresponds to the line encompassed by box 506 (FIG. 5). In this case, the XAPPHTML:IMAGE tag has been replaced by a common IMG tag in the post-processed file. The IMG tag encompassed by box 604 includes a "src" attribute identifying the image file, along with a prepended directory path identifying the installation location of the image. Again, the particular path shown is merely for illustration purposes and should not be construed as a limitation on any aspect of the present invention. Other attributes in the XAPPHTML:IMAGE tag, in particular "height" and "width", have been extracted and inserted into this processed IMG tag.

Box 606 encompasses a line of post-processed content corresponding to the pre-processed line encompassed by box 508 (FIG. 5). In this example, the content processor has replaced the XAPPHTML:HYPERLINK tag with an A tag. Additionally, an "href" to a JavaScript call has been inserted into the tag. While FIG. 6 illustrates a callback implemented using JavaScript objects, those skilled in the art will appreciate that there are other ways of implementing callback routines from browser-embedded windows, all of which fall within the scope of the present invention. In this example, a JavaScript call, "javascript:callback(1)", is inserted to implement the callback function. When a user manipulates the control in the browser-embedded window, the plug-in's callback routine is passed the value "1" as a parameter. This parameter value corresponds to the "ordinal" attribute in the XAPPHTML:HYPERLINK tag described in box 508 of FIG. 5. Again, those skilled in the art will recognize that the actual values and attributes shown in box 606 are merely for illustration purposes, and not be construed as a limitation on the present invention.

The other XAPPHTML tags from the preprocessed content of FIG. 5 are processed in a similar manner, as shown in FIG. 6. After having completely processed the plug-in supplied content, the browser-embedded window loads and displays the processed content. The browser-embedded window 308 in FIG. 3 illustrates an example of what this post-processed content might look like when displayed.

Additionally, according to this exemplary embodiment of the invention, when the content processor encounters an XAPPHTML:HYPERLINK tag while processing the content, the content processor inserts into the processed content a segment of JavaScript code to support the JavaScript call. Box 608 identifies the segment of JavaScript code that the content processor inserts when it encounters an XAPPHTML:HYPERLINK tag. When a user manipulates a control, like the one identified in box 606, the JavaScript code in box 608 will be executed by the browser-embedded window.

Figure 7:
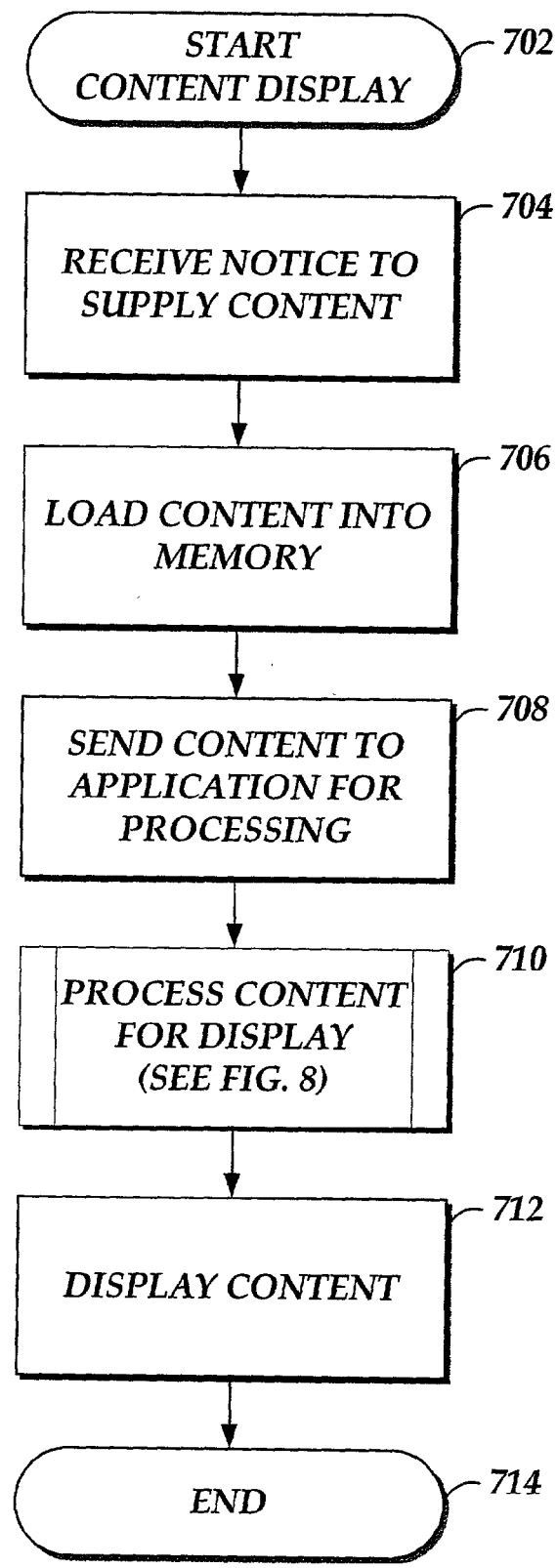
FIG. 7 is a flow diagram illustrative of receiving content from a plug-in module, processing the content, and displaying the processed content in a browser-embedded window.

FIG. 7 is a flow diagram illustrating the processing of content received from a plug-in module, and displaying the content in a browser-embedded window. Starting at 702, the method proceeds to block 704 where the plug-in module receives notice to supply its content to the host application for display in the browser-embedded window. This notice may be from the plug-in module, or, alternatively, may be from the host application. At block 706 the plug-in module loads the pre-processed content into memory. After having loaded the pre-processed content into memory, the method proceeds to block 708 where the plug-in module sends the loaded content to the host application for processing. At block 710 the host application processes the content from the plug-in module for display in the browser-embedded window. As previously described, the host application may have a separate content processing module for this purpose, or may process the content itself. A detailed description of the processing of this content is described in greater detail in regard to FIG. 8 below. After having processed the content, the process moves to block 712 where the host application creates a browser-embedded window, loads the content into the browser-embedded window, and displays the content in that window. After having displayed the processed content, the method terminates at 714.

Figure 8:
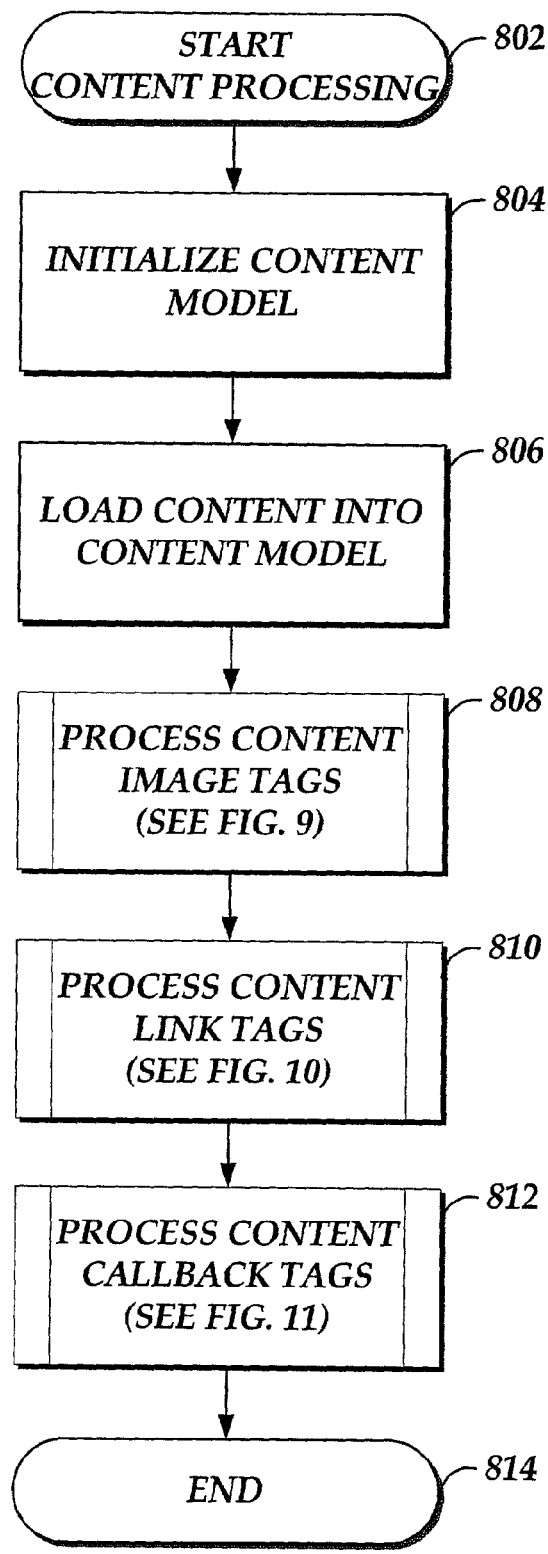
FIG. 8 is a flow diagram illustrative of processing a plug-in module's content for display in a browser-embedded window.

FIG. 8 is a flow diagram illustrating the processing of the plug-in supplied content for display in a browser-embedded window. Beginning at 802, the process moves to block 804 where the host application initializes a content model. Preferably, the content model is able to receive the plug-in supplied content and create an internal content structure containing the elements and tags of the plug-in supplied content. Individual tags may be replaced or modified by the content processing component by using the content model. Those skilled in the art will appreciate that the processing of content may be accomplished without using a content model or creating a content structure. What is important to is that the processing routine be able to recognize certain tags within the pre-processed content, and replace them with appropriate corresponding tags in the post-process content.

After initializing the content model, the process moves to block 806 where the host application loads the pre-processed content into the content model. This causes a content structure to be created containing the elements and tags of the plug-in supplied content. The process then moves to block 808, where the host application, using the content model, processes each XAPPHTML:IMAGE tag in the pre-processed content. A detailed description of the processing of XAPPHTML:IMAGE tags is discussed below in regard to FIG. 9. After processing all XAPPHTML:IMAGE tags in the plug-in supplied content, the process moves to block 810 where the host application, again using the content model, processes the XAPPHTML:LINK tags in the content. A detailed description of the processing of XAPPHTML:LINK tags is discussed below in regard to FIG. 10. After having processed all XAPPHTML:LINK tags in the plug-in supplied content, the method moves to block 812 where all of the XAPPHTML:HYPERLINK tags are similarly processed. A detailed description of processing of the XAPPHTML:HYPERLINK tags is described below in regard to FIG. 11. After having processed all XAPPHTML:LINK, XAPPHTML:IMAGE, and XAPPHTML:HYPERLINK tags included in the plug-in supplied content, the process terminates at 814.

While the method described in FIG. 8 illustrates a particular order for processing the plug-in supplied content, those skilled in the art will appreciate that the order listed is not important, and, thus, may be changed. Further, those skilled in the art will appreciate that there are additional ways of processing individual tags. As an example, a sequential pass through the content, replacing the pre-processed tags with corresponding post-processed tags may be used. These and other ways of processing the plug-in supplied content fall within the scope of the present invention.

Figure 9:
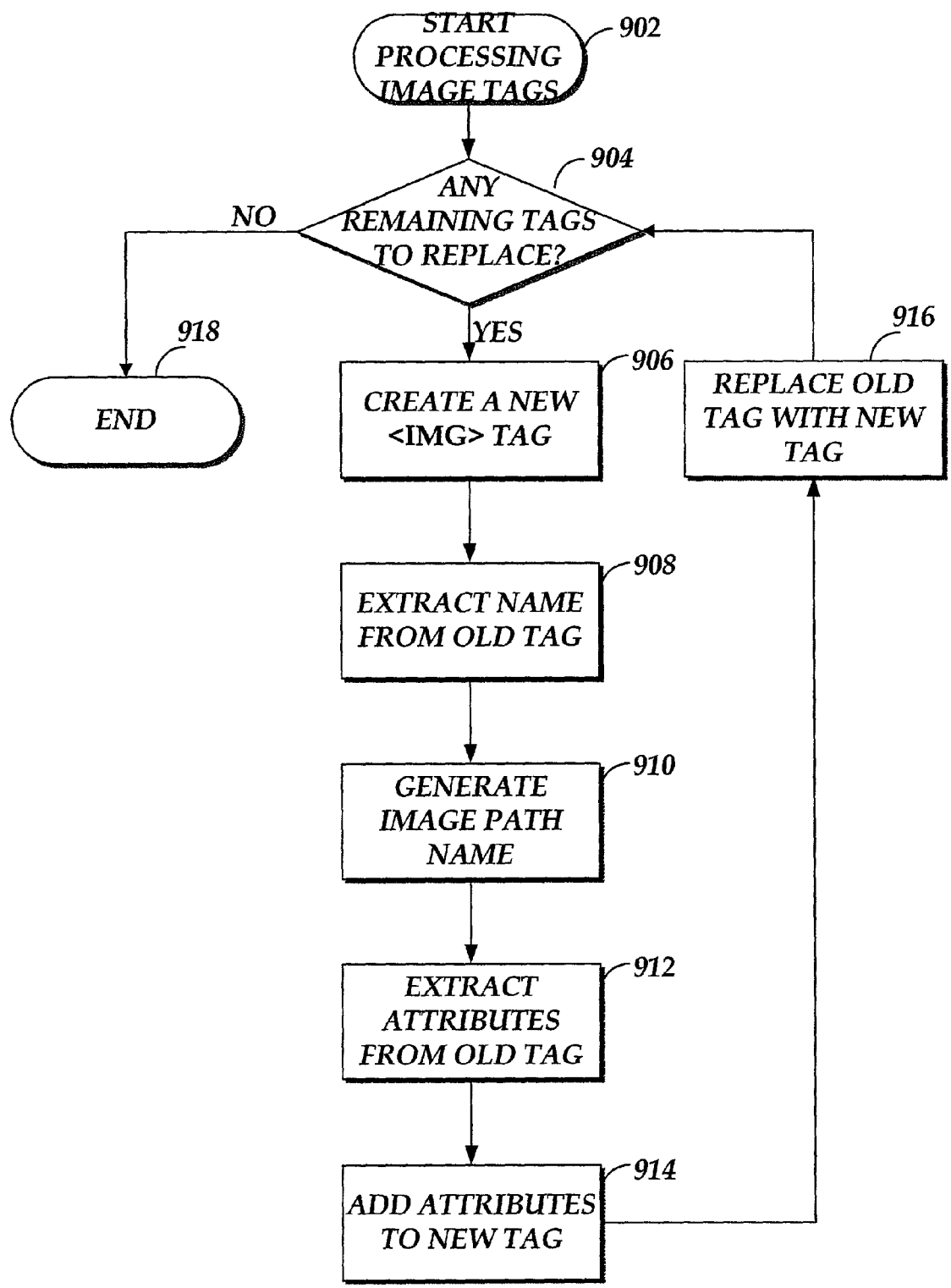
FIG. 9 is a flow diagram illustrative of processing image tags in a plug-in module's content.

FIG. 9 is an exemplary flow diagram illustrating the processing of XAPPHTML:IMAGE tags in the plug-in supplied content. Starting at 902, the process moves to decision block 904, where a test is made to determine whether there are any remaining XAPPHTML:IMAGE tags to replace in the content model. If the process determines that there are XAPPHTML:IMAGE tags to be replaced, the process moves to block 906 where a new IMG tag is created. The process then moves to block 908 where the name of the image is extracted from the unprocessed XAPPHTML:IMAGE tag. Moving to block 910, the process then generates the image path name. This includes the path name of the host application, and any special subdirectories for images. The name extracted from the unprocessed XAPPHTML:IMAGE tag is then appended onto the image path to complete the image path name. After generating a path name to the image, the process moves to block 912 where attributes included in the unprocessed XAPPHTML:IMAGE tag are extracted. At block 914 the extracted attributes are inserted into the new IMG tag. At block 916 the process replaces the unprocessed XAPPHTML:IMAGE tag in the content model with the new IMG tag recently created. After replacing the XAPPHTML:IMAGE tag with the IMG tag, the process returns to decision block 904 where a determination is made whether there are remaining XAPPHTML:IMAGE tags to be replaced. The process repeats until all XAPPHTML:IMAGE tags have been replaced in the content model. The process then terminates at 918.

Figure 10:
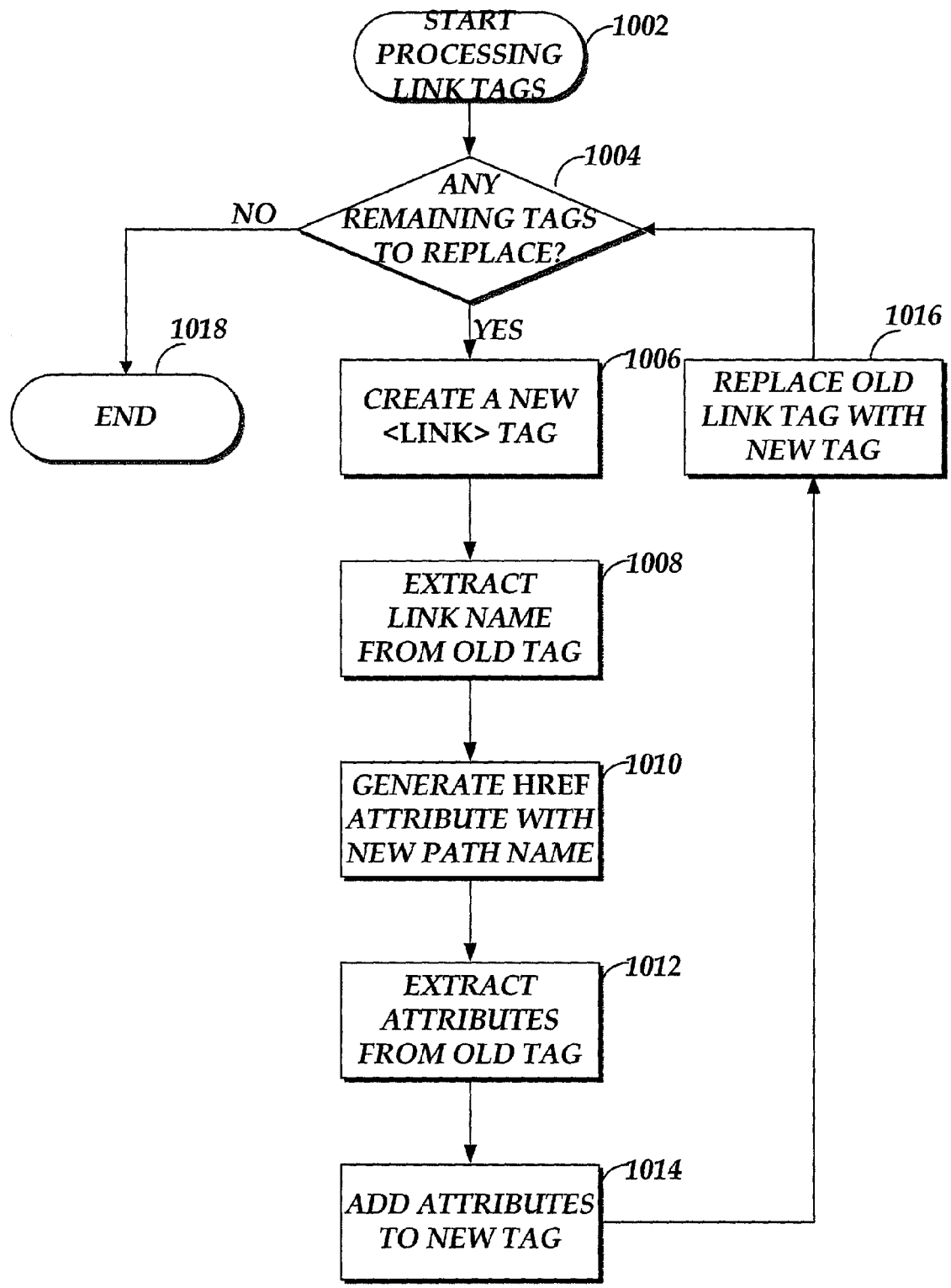
FIG. 10 is a flow diagram illustrative of processing link tags in a plug-in module's content.

FIG. 10 is an exemplary flow diagram illustrating the processing of XAPPHTML:LINK tags in the plug-in supplied content. The processing of XAPPHTML:LINK tags begins at 1002 and proceeds to decision block 1004. At decision block 1004 the process determines whether there are any unprocessed XAPPHTML:LINK tags in the content model to be replaced. If the process determines that there are unprocessed XAPPHTML:LINK tags to be replaced, the process proceeds to block 1006 where a new LINK tag is created. After having created the new LINK tag, the process moves to block 1008 where the link name is extracted from the unprocessed XAPPHTML:LINK tag. After extracting the link name from the XAPPHTML:LINK tag, the process moves to block 1010 where an HREF attribute with a new path name is generated. This path name includes the host application directory structure, plus any additional information extracted from the unprocessed XAPPHTML:LINK tag. The process then moves to block 1012 where any other attributes from the unprocessed XAPPHTML:LINK tag are extracted. Moving to block 1014, the process adds the extracted attributes from the unprocessed tag to the new LINK tag. After adding the attributes to the new LINK tag, the process moves to block 1016 where the content model replaces the unprocessed XAPPHTML:LINK tag with the new LINK tag. The process then returns to decision block 1004 to determine whether there are any remaining unprocessed XAPPHTML:LINK tags in the content model to be replaced. The process repeats until all XAPPHTML:LINK have been replaced. After all link tags in the content model have been replaced, the process terminates at 1018.

Figure 11:
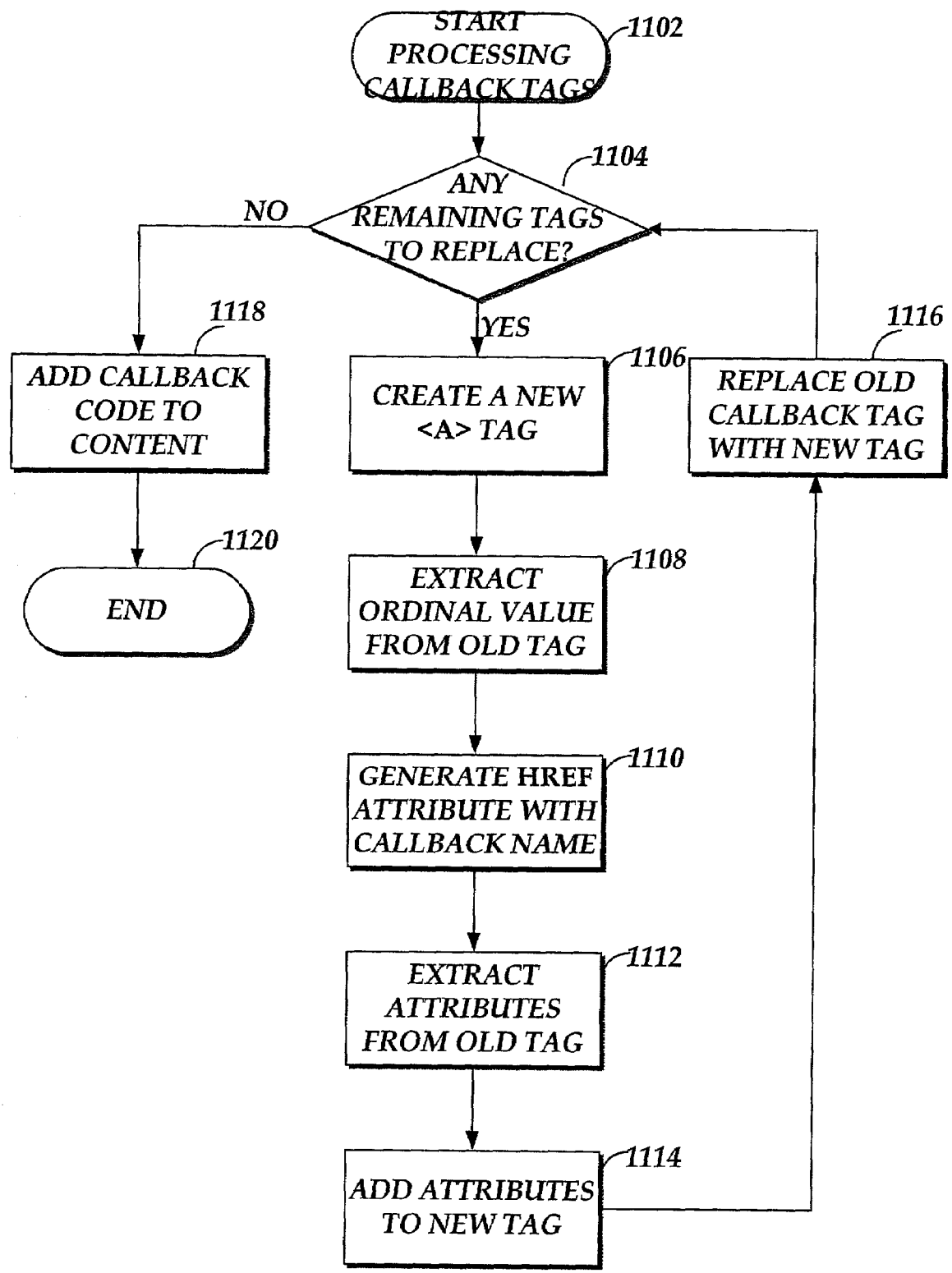
FIG. 11 is a flow diagram illustrative of processing hyperlink tags in a plug-in module's content.

FIG. 11 is an exemplary flow diagram illustrating the processing of XAPPHTML:HYPERLINK tags in the plug-in supplied content. Beginning at 1102, the process moves to decision block 1104 where a test is made to determine whether there are any unprocessed XAPPHTML:HYPERLINK tags to be replaced in the content model. If, at decision block 1104, the process determines that there are XAPPHTML:HYPERLINK tags to be replaced, the process moves to block 1106 where a new A tag is created. After creating the new A tag, the process moves to block 1108 where the ordinal attribute from the unprocessed XAPPHTML:HYPERLINK tag is extracted. The process moves to block 1110 where an HREF attribute within the A tag, including a call on a JavaScript object, which will be added to the processed content, is generated. After generating the HREF attribute, the process moves to block 1112 where all other attributes from the unprocessed XAPPHTML:HYPERLINK tag are extracted. The process then moves to block 1114 where the extracted attributes are added to the new A tag. After adding the attributes to the new A tag, the process moves to decision block 1116 where the unprocessed XAPPHTML:HYPERLINK tag is replaced with the new A tag. After replacing the unprocessed XAPPHTML:HYPERLINK tag in the content model, the process returns to decision 1104 to determine whether there are any remaining unprocessed XAPPHTML:HYPERLINK tags to be replaced. The process of replacing the XAPPHTML:HYPERLINK tags repeats until all have been replaced. After all of the XAPPHTML:HYPERLINK tags have been replaced within the content model, the process moves to block 1118.

At block 1118, if at least one XAPPHTML:HYPERLINK tag has been replaced in the content model, the process inserts into the content structure the JavaScript callback code which facilitates a return call, or callback, to the plug-in module. After having inserted the JavaScript callback code, if necessary, the process terminates at 1120. Alternatively, the process may always inserts the JavaScript callback code, regardless of whether or not any XAPPHTML:HYPERLINK tags have been replaced. As those skilled in the art will appreciate, always adding the callback code will not alter the display of the content in the browser-embedded window.

Figure 12:
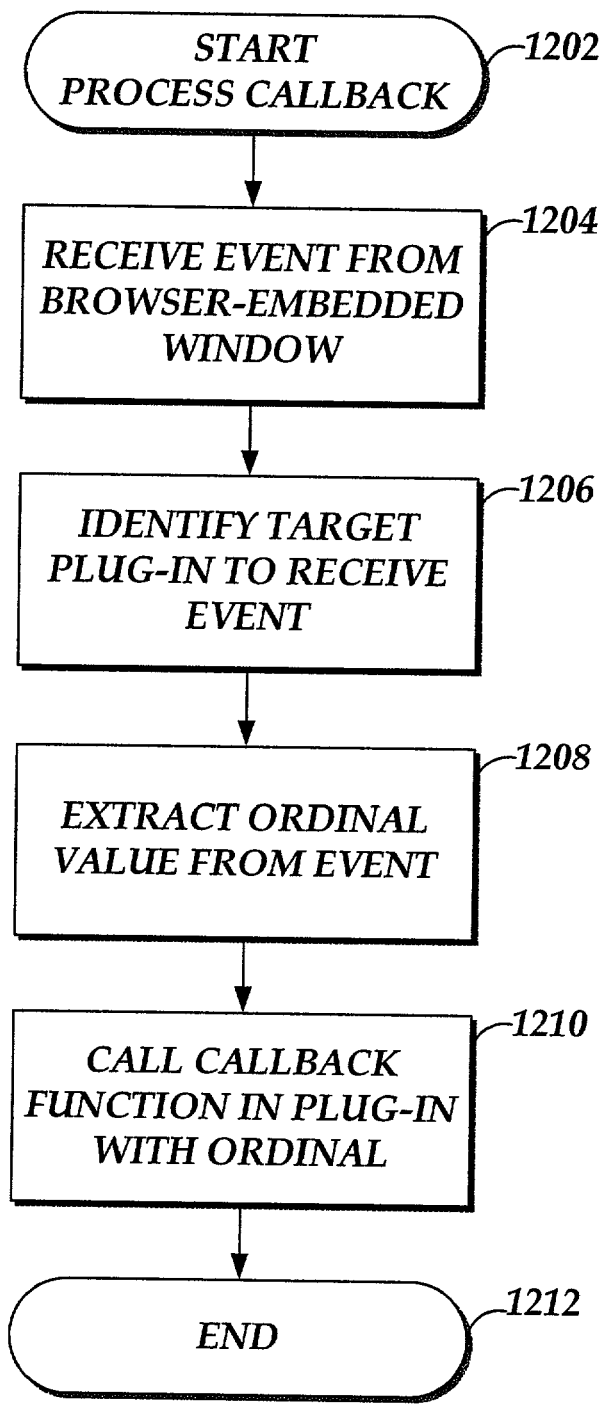
FIG. 12 is a flow diagram illustrative of processing control events received from control objects in a browser-embedded window and routing the events to a plug-in module.

FIG. 12 is a flow diagram illustrating the processing of event messages received from manipulated controls embedded in a browser-embedded window and routing the events to the plug-in module as callbacks. Beginning at 1202, the process moves to block 1204 where the host application receives an event message from the browser-embedded window. As those skilled in the art will recognize, an event message is generated when a user manipulates a control embedded in the displayed content. At block 1206 the host application identifies the target plug-in to receive the event. Depending on the embodiment of the invention, a host application may support more than one plug-in module simultaneously. When supporting multiple plug-in modules, it is important for the host application to properly identify the intended target plug-in module to receive a callback event. After identifying the appropriate plug-in module to receive the event message from the browser-embedded window, the process moves to block 1208 where the ordinal value from the event message is extracted. The process then proceeds to block 1210 where the host application makes a call to the callback function implemented by the target plug-in module, and passes the ordinal value from the event message as a parameter with the callback call. The process then terminates 1212.

While the presently preferred embodiment of the invention has been illustrated and described, as noted above, and in other ways, it will be appreciated that various changes can be made therein without departing from the spirit and scope of the invention as defined by the appended claims.

The invention claimed is:

1. A system for processing and displaying content in a browser embedded display, comprising a host application and a plug-in module installed in the host application,
   (a) wherein the plug-in module is operable to supply content to the host application, the plug-in supplied content comprising:
      (i) data ready for display in a browser embedded display; and
      (ii) at least one embedded processing tag unsuitable for display in a browser embedded display, wherein the at least one embedded processing tag comprises at least one embedded callback tag, and wherein the at least one embedded callback tag comprises control information identifying a user manipulable control to be displayed in a browser-embedded display and callback information to be transmitted to the plug-in module through a callback method implemented by the plug-in module when a user manipulates the user manipulable control displayed in a browser-embedded display;
   (b) and wherein the host application, upon receiving a request to display the plug-in supplied content, is operable to:
      (i) convert the at least one embedded processing tag into data ready for display in a browser-embedded display; and
      (ii) display the plug-in supplied content, including the converted at least one embedded processing tags, in a browser-embedded display.

2. The system of claim 1, wherein the at least one embedded processing tag comprises at least one embedded reference tag, the at least one embedded reference tag comprising reference information identifying additional plug-in supplied content stored in a location established by the host application according to the type of the additional plug-in supplied content.

3. The system of claim 2, wherein converting the at least one embedded processing tag into data ready for display in a browser-embedded display comprises converting the at least one embedded reference tag into data ready for display in a browser-embedded display.

4. The system of claim 3, wherein converting the at least one embedded reference tag into data ready for display in a browser-embedded display comprises:
   (a) obtaining a partial path name from the reference information in the at least one embedded reference tag identifying the additional plug-in supplied content;
   (b) creating a completed path name using the partial path name identifying the additional plug-in supplied content; and
   (c) replacing the embedded reference tag with reference data, the reference data including the completed path name to the additional plug-in supplied content, the reference data being data ready for display in a browser-embedded display.

5. The system of claim 4, wherein creating a completed path name using the partial path name comprises:

(a) obtaining an installation path name of an installation location established by the host application according to the type of the additional plug-in supplied content; and (b) appending the partial path name identifying the additional plug-in supplied content to the installation path name of an installation location.

6. The system of claim 2, wherein the at least one embedded reference tag comprises at least one image tag, the at least one image tag identifying an image file stored in a location established by the host application for storing image files.

7. The system of claim 2, wherein the at least one embedded reference tag comprises at least one link tag, the at least one link tag identifying a hyperlink file stored in a location established by the host application for storing hyperlink files.

8. The system of claim 1, wherein converting the at least one embedded processing tag into data ready for display in a browser-embedded display comprises converting the at least one embedded callback tag into data ready for display in a browser-embedded display.

9. The system of claim 1, wherein converting the at least one embedded callback tag into data ready for display in a browser-embedded display comprises:
   (a) generating control data according to the control information identifying the user manipulable control to be displayed in a browser-embedded display and according to the callback information to be transmitted to the plug-in module when a user manipulates the user manipulable control displayed in the browser-embedded display; and
   (b) replacing the embedded callback tag with the generated control data, the generated control data.

10. The system of claim 1, wherein the host application is further operable to receive a message from the browser-embedded display containing callback information when a user manipulates a user manipulable control in the browser-embedded display, and transmit the callback information to the plug-in module by passing the callback information to the callback routine implemented by the plug-in module for receiving callback information from the host application.

11. The system of claim 1, wherein the plug-in supplied content is an Extensible HyperText Markup Language (XHTML) file.

12. The system of claim 1, wherein the plug-in supplied content is an Extensible Markup Language (XML) file.

13. The system of claim 1, wherein the plug-in supplied content is a HyperText Markup Language (HTML) file.

14. The system of claim 1, wherein the embedded processing tags are identifiable to the host application from the data ready for display in a browser-embedded display by using a namespace identifier in the at least one embedded processing tag.

15. A method for processing and displaying content in a browser-embedded display, comprising:
   (a) obtaining plug-in supplied content from a plug-in module installed in the host application, the plug-in supplied content comprising:
      (i) data ready for display in a browser-embedded display; and
      (ii) at least one embedded processing tag unsuitable for display in a browser-embedded display, wherein the at least one embedded processing tag comprises at least one embedded callback tag, and wherein the at least one embedded callback tag comprises control information identifying a user manipulable control to be displayed in a browser-embedded display and callback information to be transmitted to the plug-in module through a callback method implemented by the plug-in module when a user manipulates the user manipulable control displayed in a browser-embedded display;
   (b) upon receiving a request for the plug-in supplied content, converting the at least one embedded processing tag unsuitable for display in a browser-embedded display in the plug-in supplied content into data ready for display in a browser-embedded display; and
   (c) displaying the plug-in supplied content, including the converted at least one embedded processing tag, in a browser-embedded display.

16. The method of claim 15, wherein the at least one embedded processing tag comprises at least one embedded reference tag, the at least one embedded reference tag comprising information identifying additional plug-in supplied content stored in a location established by the host application according to the type of the additional plug-in supplied content.

17. The method of claim 16, wherein converting the at least one embedded processing tag into data ready for display in a browser-embedded display comprises converting the at least one embedded reference tag into data ready for display in a browser-embedded display.

18. The method of claim 17, wherein converting the at least one embedded reference tag into data ready for display in a browser-embedded display comprises:
   (a) obtaining a partial path name from the reference information in the at least one embedded reference tag identifying the additional plug-in supplied content;
   (b) creating a completed path name to the additional plug-in supplied content; and
   (c) replacing the at least one embedded reference tag with reference data, the reference data including the completed path name to the additional plug-in supplied content.

19. The method of claim 18, wherein creating a completed path name to the additional plug-in supplied content comprises:
   (a) obtaining an installation path name of an installation location established by the host application according to the type of the additional plug-in supplied content; and
   (b) appending the partial path name identifying the additional plug-in supplied content to the installation path name of an installation location.

20. A computer readable medium having computer readable instructions capable of performing the method recited in claim 18.

21. A computer system having a processor, a memory, and an operating environment, and wherein the computer system is operable to perform the method of claim 18.

22. The method of claim 16, wherein the at least one embedded reference tag comprises at least one image tag, the at least one image tag identifying an image file stored in a location established by the host application for storing image files.

23. The method of claim 16, wherein the at least one embedded reference tag comprises at least one link tag, the at least one link tag identifying a hyperlink file stored in a location established by the host application for storing hyperlink files.

24. The method of claim 15, wherein converting the at least one embedded processing tag into data ready for display in a browser-embedded display comprises converting the at least one embedded callback tag into data ready for display in a browser-embedded display.

25. The method of claim 15, wherein converting the at least one embedded callback tag into data ready for display in a browser-embedded display comprises:
(a) generating control data according to the control information identifying the user manipulable control to be displayed in a browser-embedded display and according to the callback information to be transmitted to the plug-in module when a user manipulates the user manipulable control displayed in the browser-embedded display; and
(b) replacing the at least one embedded callback tag with the generated control data.

26. A computer readable medium having computer readable instructions capable of performing the method recited in claim 25.

27. A computer system having a processor, a memory, and an operating environment, and wherein the computer system is operable to perform the method of claim 25.

28. The method of claim 15 further comprising receiving a message from the browser-embedded display comprising callback information when a user manipulates a user manipulable control in the browser-embedded, and transmitting the callback information to the plug-in module by passing the callback information to a callback routine implemented by the plug-in module for receiving callback information from the host application.

29. The method of claim 15, wherein the plug-in supplied content is an Extensible HyperText Markup Language (XHTML) file.

30. The method of claim 15, wherein the plug-in supplied content is an Extensible Markup Language (XML) file.

31. The method of claim 15, wherein the plug-in supplied content is a HyperText Markup Language (HTML) file.

32. The method of claim 15, wherein the at least one embedded processing tag is identifiable to the host application from the data ready for display in a browser-embedded display by using a namespace identifier in the at least one embedded processing tag.

33. A computer readable medium having computer readable instructions capable of performing the method recited in claim 15.

34. A computer system having a processor, a memory, and an operating environment, and wherein the computer system is operable to perform the method of claim 15.

35. A computer readable medium having computer-displayable components for display in a browser embedded display, the computer-displayable components comprising:
data components including data ready for display in a browser embedded display; and
processing components including at least one processing tag requiring conversion by a host module into data ready for display in a browser embedded display upon request to display the processing and data components in a browser embedded display, wherein the at least one processing tag suitable for conversion by a host module into data ready for display in a browser embedded display comprises at least one callback tag comprising:
control information identifying a user manipulable control to be displayed in a browser-embedded display; and
callback information to be transmitted to a plug-in module by the browser-embedded display when a user manipulates the user manipulable control displayed in the browser embedded display.

36. The computer readable medium of claim 35, wherein the at least one processing tag suitable for conversion by a host module into data ready for display in a browser embedded display comprises at least one reference tag comprising reference information identifying additional computer-displayable components stored in a location established by the host module according to the type of the additional computer-displayable components.

37. The computer readable medium of claim 36, wherein the reference information identifying additional computer-displayable components comprises a partial pathname identifying the additional computer-displayable components stored in a location established by the host module according to the type of the additional computer-displayable components.

38. The computer readable medium of claim 36, wherein the at least one reference tag comprises at least one image tag identifying an image file stored in a location established by the host module for storing image files.

39. The computer readable medium of claim 36, wherein the at least one reference tag comprises at least one link tag identifying a hyperlink file stored in a location established by the host module for storing hyperlink files.

40. The computer readable medium of claim 35, wherein computer-displayable components are Extensible HyperText Markup Language (XHTML) files.

41. The computer readable medium of claim 35, wherein computer-displayable components are Extensible Markup Language (XML) files.

42. The computer readable medium of claim 35, wherein computer-displayable components are HyperText Markup Language (HTML) files.

43. The computer readable medium of claim 35, wherein the processing components are identifiable from the data components by using a namespace identifier in the processing components.

* * * * *